XR 4,008,564

United Stat

Luce et al.

[11] 4,008,564

[45] Feb. 22, 1977

[54] LIQUID CRYSTAL DISPLAY DEVICE

[76] Inventors: Nunzio A. Luce, 39 Galston Drive, R.D. No. 4, Trenton, N.J. 08691; Louis A. Zanoni, 13 Greentree Road, Mercerville, N.J. 08619

[22] Filed: June 9, 1972

[21] Appl. No.: 261,252

[52] U.S. Cl. .............................. 58/23 R; 58/50 R; 58/127 R; 350/160 LC

[51] Int. Cl.[2] ................... G04C 3/00; G04B 19/06; G02F 1/13

[58] Field of Search ............ 58/50 R, 127 R, 23 R; 313/108 R, 108 D; 315/169 R, 169 TV; 350/160 R, 160 LC

[56] References Cited

UNITED STATES PATENTS

| | | | |
|---|---|---|---|
| 3,672,155 | 6/1972 | Bergey et al. | 58/85.5 |
| 3,674,341 | 7/1972 | Hedman, Jr. et al. | 350/160 LC |
| 3,702,723 | 11/1972 | Borden, Jr. | 350/160 LC |
| 3,715,881 | 2/1973 | Girard | 58/50 R |
| 3,718,380 | 2/1973 | Wysocki | 350/160 LC |

*Primary Examiner*—E. S. Jackmon

[57] ABSTRACT

A liquid crystal display device comprises a liquid crystal display cell in combination with electronic circuit elements coupled thereto. The liquid crystal cell comprises a layer of a liquid crystal composition between two electrodes having electrode configurations thereon.

The circuit elements, which may be in the form of an integrated circuit chip, or discrete elements, or a combination thereof, are mounted on a substrate of the liquid crystal display cell via conductive pads provided on the substrate. The substrate contains a segmented electrode pattern, each segment of which is provided with a lead to an appropriate conductive pad which pads interconnect the segment to one or more circuit elements. A cover or encapsulant may be placed over the liquid crystal display cell or over the entire assembly.

3 Claims, 5 Drawing Figures

LIQUID CRYSTAL DISPLAY DEVICE

BACKGROUND OF THE INVENTION

This invention relates to liquid crystal display devices and particularly to the structure of a liquid crystal display cell integrated with circuit elements for operating the liquid crystal display cell.

A typical liquid crystal display device consists of a liquid crystal display cell and driving and logic circuitry associated therewith. The display cell comprises a thin layer of a liquid crystal composition between two parallel electrodes, at least one of which is segmented. In any area of the liquid crystal composition to which a low voltage activating signal is applied, the optical properties of the composition are altered, thereby modulating light passing therethrough or impinging thereon. Generally, light modulation occurs due to a change in either the light scattering properties of the liquid crystal material or the rotation of the plane of polarization of light passing therethrough upon the application of the activating voltage thereto. Typically, thin layers of a liquid crystal composition which modulates light due to a change in its light scattering properties changes in appearance from transparent to white upon the application of an activating voltage. However, materials are known which appear white in the absence of an applied voltage and become clear upon the application of an activating voltage. Liquid crystal devices which operate based upon a change in the direction of polarization upon the application of a field are also known. In these devices the display cell is placed between polarizers when operating with white light. These latter devices may change in appearance from dark to white or vice versa upon the application of an activating voltage.

In addition, liquid crystal devices can be operated in either a reflective or transparent mode. Liquid crystal display devices require very little power for operation and maintain excellent brightness and contrast under high ambient light conditions.

The present invention provides a liquid crystal display device which permits the fabrication of miniaturized, compact devices at relatively low costs. The device may operate in any of the aforementioned modes or contain any known electro-optically responsive liquid crystal composition or other electro-optic responsive material, such as particles suspended in a liquid vehicle.

For many applications of liquid crystal display devices such as wrist watches and portable calculators, compactness of the device is essential for commercial success and every improvement toward miniaturization of the device is of importance.

Characteristically, the circuit elements which comprise the logic, control, drive and switching circuits for operating the liquid crystal display cell of the display device are remote from the display cell or at least are mounted upon a common substrate together with a prefabricated display cell. This latter approach, while greatly preferred over remotely situated circuit elements, when compactness is required, add to the thickness of the overall device by requiring a substrate which is in addition to and independent from display cell and upon which the display cell is mounted.

The present invention provides a structure which can further miniaturize the liquid crystal display device at least by reducing the thickness of the device. The structure of the present invention also reduces or eliminates the need for bonding separate thin wire leads from the display cell segments to the appropriate circuit elements. This results in a cost reduction of the fabricated device.

SUMMARY OF THE INVENTION

An electro-optical display device comprises an electro-optical display cell and associated circuit elements. The display cell comprises a layer of an electro-optically active medium between support plates which are provided with electrodes thereon. The electrode of at least one support plate is in the form of a segmented pattern. The improvement over the prior art comprises the use of a support plate which not only acts as the segmented electrode pattern but which also is provided with means for mounting circuit elements directly thereon, thereby eliminating the need of a separate substrate for mounting of the display cell and circuit elements. The circuit element mounting means comprise a plurality of conductive pads, each pad being interconnected with a display segment by means of a conductive path provided on the substrate. The appropriate circuit elements are mounted directly upon the liquid crystal display cell substrate by means of the conductive mounting pads. This obviates the need of a separate substrate, resulting in a thinner cell and does away with the need for bonding small lead wires which, in prior art devices, extend from electrode segment leads which extend from each segment to leads on a separate substrate where the circuit elements are mounted.

DETAILED DESCRIPTION OF THE INVENTION

Figure 1:
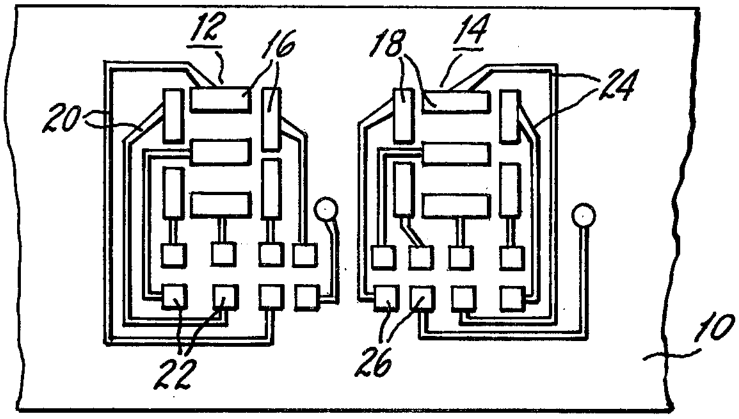
FIG. 1 is a top plan view of a portion of a novel substrate for a multi-character segmented liquid crystal display device having conductive mounting pads thereon for mounting circuit elements thereto.

Referring to FIG. 1 there is shown a partial plan view of a substrate 10 of a multicharacter segmented electro-optical display cell. The portion of the substrate 10 as shown is provided with two conductive segmented characters, 12 and 14, each character having seven conductive segments, 16 and 18, respectively. The segments 16 from the character 12 are provided with conductive leads 20 extending therefrom. Each conductive lead 20 is shown to terminate at a conductive mounting pad 22. Similarly, the segments 18 from the other character 14 are provided with conductive leads 24 which terminate at a second set of conductive mounting pads 26. In the embodiment shown in FIG. 1 the conductive pads 22 and 26 are arranged in a regular pattern on the same side of the substrate as the segmented characters to facilitate the mounting of circuit elements thereon necessary for operating the display device. The mounting pads typically consist of a solderable metal such as a low temperature indium solder which adheres well to and makes ohmic contact with the conductive leads 24. The conductive leads are typically of indium oxide when transparent conductors are employed or aluminum when reflective conductors are employed.

It is understood that the invention is not limited to seven segment characters or to numeric characters. Neither is the invention limited to any specific configuration number or pattern of the conductive mounting pads.

In the completed device (FIG. 2) there is a support plate 30 positioned over the substrate 10 and an active electro-optical material 32 between the substrate 10 and the support plate 30. The support plate 30 is also provided with electrodes 34 and is narrower than the substrate. It is positioned such that the support plate 30 does not extend over the conductive pads 22 and 26. In this way the support plate 30 does not interfere with the mounting of circuit elements on the conductive mounting pads 22 and 26. In addition, the electrodes of the support plate 30 lie over and register with the segmented characters 12 and 14 on the substrate 10. The electrodes 34 on the support plate 30 should not overlie the conductive leads 20 and 24 of the substrate 10. Consequently, the only portion of the electro-optically active material 32 which will be activated will be that material opposite an activated segment.

Figure 2:
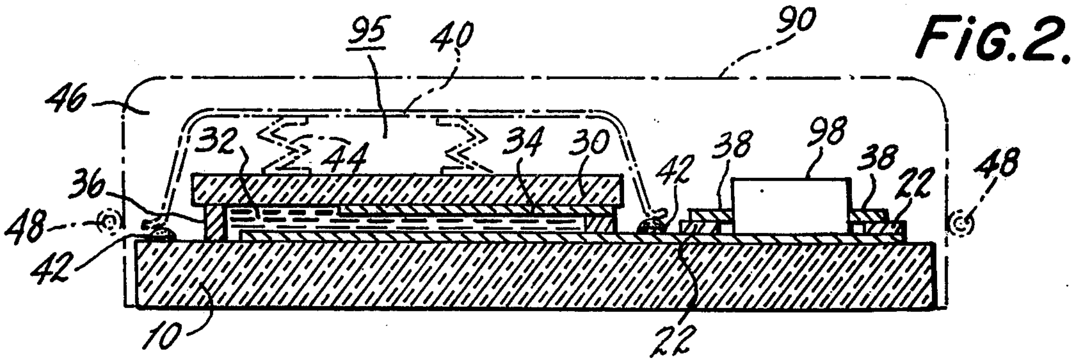
FIG. 2 is a side elevational view of a liquid crystal device employing a substrate as shown in FIG. 1.

Referring to FIG. 2 there is shown a liquid crystal electro-optical display device 90 which includes a liquid crystal display cell 95 and circuit element 98.

The liquid crystal display cell 95 comprises the substrate 10 as shown in FIG. 1. When the substrate 10 is the front of the display device, the substrate 10 is transparent and the segmented electrodes 14 are in the form of a transparent conductive coating on the substrate 10. Separated from the substrate 10 by spacer means 36 is the back support plate 30. The space provided by the spacer means 36 is typically from ¼ to ¾ mil but may be more or less. The back support plate 30 which rests on the spacer means 36 and lies over the substrate 10 is provided with an electrode pattern 34 which registers with the display characters 12 and 14 on the substrate 10.

The circuit elements 98 may comprise single chip monolithic integrated circuits using, for example, complementary MOS technology or hybrid circuits on, for example, ceramic flip-chips or discrete circuits elements interconnected to form a circuit or any combination of the above. The circuit elements are used typicaly to form, for example, driver circuits, frequency divider circuits, up-converter circuits, counter circuits, decoder circuits and switching circuits. In addition to the circuit elements the display device 90 to be operable must include a power supply (not shown). For use as a wrist watch a typical power supply is a small 1.5 V battery which an up-converter circuit converts to 15 volts for driving the liquid crystal cell. In addition, when the display device is a wrist watch or other timekeeping device, a standard oscillator (not shown) is included. A typical oscillator for use in a timepiece is a quartz crystal oscillator having a frequency of about 32,768 Hertz.

Figure 5:
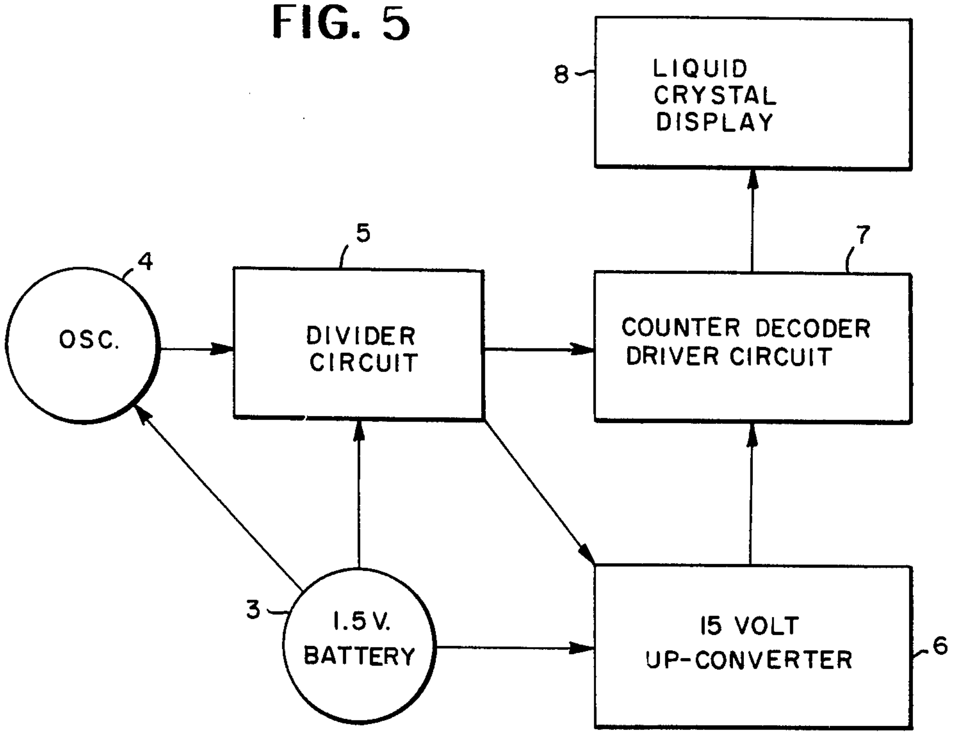
FIG. 5 is a block diagram of the circuit elements of a typical electronic watch.

FIG. 5 is a block circuit diagram representing a typical circuit for operation of a liquid crystal timepiece. The circuit comprises a battery 3 which provides power to an oscillator 4, a divider circuit 5, and a voltage up-converter 6. The oscillator 4 is a high frequency device as stated above. The frequency is divided by the divider circuit 5 which is coupled to the output oscillator. This latter circuit 7 is driven by the higher frequency output from the circuit 6. The output of the counter-decoder driver circuit 7 is connected to a liquid crystal display 8. A time setting input means 9 is also shown coupled to the counter-decoder driver circuit 7.

A feature of the present invention is the mounting of at least the circuit elements 98 and preferably the power supply and oscillator, if any, on the substrate 10 of the display cell 95. In accordance with FIG. 2 there is shown a circuit element 98 mounted on the conductive mounting pads 22 of the display cell substrate 10 by means of solderable or otherwise bondable leads 38 extending from appropriate portions of the circuit elements 98. The circuit selectively activates the conductive segments corresponding to the respective conductive mounting pad in accordance with the input logic of the device.

For use as a reflective display device, the electrode 34 on the back support plate 30 is specularly reflecting. Contact to this electrode may be provided by means of a top support plate electrode contact lead provided on the substrate, which when the device is assembled, makes contact with a portion of the top support plate electrode. Alternatively, contact may be made by a wire bond or a conductive post.

For a commercially suitable device, the liquid crystal composition 32 should be sealed from the atmosphere. One method of providing a seal is by means of a can 40 which encloses the back support plate 30 and liquid crystal composition 32 and is sealed to the substrate 10. Where the can is metal and therefore conducting, an insulator 42 must be provided over the conductive segment leads 20 and 24 so as not to be short circuited by the can. The insulator 42 is generally a dielectric film or frit provided in an continuous ring around the portion of the substrate where the can 40 is to be fused. While the can 40, as shown, covers only the display cell portion of the device, it should be understood that it may enclose the circuit elements 98 as well.

A spring mechanism 44 which is bonded to the can 40 and the back support plate 30 is also shown as an optional addition. This spring fascilitates device assembly.

An alternative method of sealing the liquid crystal composition is to provide a seal around the periphery of the back support plate, thereby sealing it directly to the substrate.

Still another sealing means (shown as dotted lines in FIG. 2) which may be used together with or independently of the aforementioned seals is a completely encapsulation of the device with a potting material 46. For use as a wrist watch, the die or form used during potting can be made such that means, such as ears 48, are formed at the time of potting for attaching the device to a wrist band, thereby reducing costs and obviating the need for providing a separate watch crystal. When potting is employed, it is advantageous to use a black or other dark colored potting compound so as to increase the contrast of the display.

Figure 3:
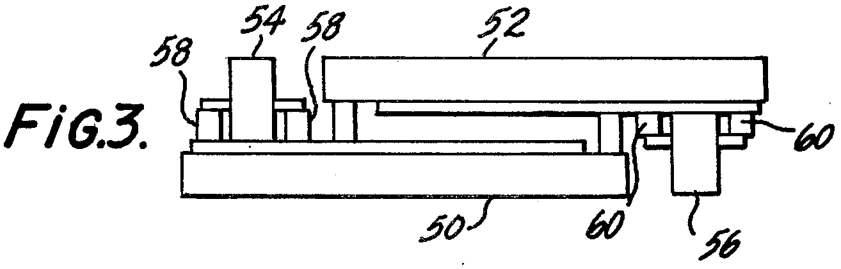
FIG. 3 is a side elevational view of a liquid crystal device wherein both substrates are provided with conductive mounting pads for circuit elements.

Referring to FIG. 3 there is shown another embodiment of the invention using offset substrates 50 and 52 each of which include circuit elements 54 and 56, respectively, bonded thereto by means of conductive bonding pads 58 or 60 similar to the embodiment described above.

Figure 4:
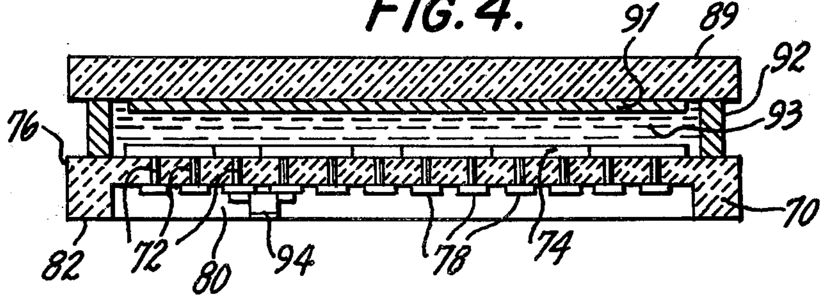
FIG. 4 is another embodiment of the invention wherein conductive feed throughs are employed through the substrate and the circuit elements are mounted on the back of the substrate.

Referring to FIG. 4 there is shown an alternate substrate configuration to that shown in FIGS. 1 and 2. Here the substrate 70 is provided with conductive feed-throughs 72 which couple each electrode segment 74 on the top surface 76 of the substrate 70 with a conductive circuit element mounting pads 78 on the bottom of the substrate. The substrate may be provided with a well portion 80 in which the mounting pads 78 are located so as to minimize device thickness. Alternatively, the feed-throughs 72 may extend to the back surface 82 of the substrate and the mounting pads 78 there located. When this embodiment is employed, the segmented electrode are reflective rather than transparent. Also the substrate need not be a transparent material as it becomes the back of the display device. As before, the completed display cell includes a support plate 89 which would be the top support plate and must be transparent. This top support plate 90 has a transparent top electrode 91 thereon and is spaced from the substrate by spacer means 92. The active liquid crystal material 93 occupies the space between the support plate 89 and substrate 70. The circuit elements 94 are again mounted directly on the substrate 70, which is an integral part of the display cell, by means of the conductive circuit element mounting pads.

It should be understood that additional circuit element mounting pads and conductive leads can be provided in any of the embodiments for interconnecting various circuit elements of the device.

What is claimed is:

1. A digital electronic watch comprises a liquid crystal display cell, a power supply, an oscillator and associated circuit elements, interconnected for operating said watch, including circuit elements for performing functions of dividing, counting, decoding, and increasing voltage, said liquid crystal display cell of said watch comprises a substrate having thin film segmented electrodes thereon forming numeric character patterns, a support plate having an electrode coating thereon spaced from said substrate by spacer means, an electro-optically active liquid crystal composition in said space between said electrodes of said substrate and support plate, thin film conducting leads on said substrate extending from said electrode segments, said conductive leads terminating on said substrate at a solderable circuit element mounting pad, said associated circuit elements being mounted on said mounting pads and means for sealing said liquid crystal cell, wherein said substrate, segmented electrodes and conductive leads are transparent and wherein said electrode on said support plate is a reflective metal film, said segmented electrodes and conductive leads comprising an indium oxide film.

2. A digital electronic watch comprises watch components including an electro-optic display cell, a power supply, an oscillator and associated circuit elements interconnected for operating said watch, including circuit elements for performing functions of dividing, counting and decoding, said display cell of said watch comprises a substrate having thin film segmented electrodes thereon forming numeric character patterns, a support plate having an electrode coating thereon spaced from said substrate by spacer means, an electro-optically active composition in said space between said electrodes of said substrate and support plate, thin film conductive leads on said substrate extending from said electrode segments, said conductive leads terminating on said substrate at a solderable circuit element mounting pad, said associated circuit elements being mounted on said mounting pads and means for sealing said crystal cell and wherein said watch components are encapsulated in a potting compound, said encapsule including a pair of ears at opposite sides of said watch adapted for attaching a wrist band thereto.

3. The device recited in claim 2 wherein said potting compound is of a dark color.

* * * * *